(12) United States Patent
Kano et al.

(10) Patent No.: US 11,463,893 B2
(45) Date of Patent: Oct. 4, 2022

(54) MOBILE TERMINAL TESTING SYSTEM, MOBILE TERMINAL TESTING DEVICE, AND CONTROL METHOD FOR MOBILE TERMINAL TESTING SYSTEM

(71) Applicant: ANRITSU CORPORATION, Kanagawa (JP)

(72) Inventors: Daiki Kano, Kanagawa (JP); Yuki Naruse, Kanagawa (JP); Keiichi Mineda, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 149 days.

(21) Appl. No.: 17/153,347

(22) Filed: Jan. 20, 2021

(65) Prior Publication Data

US 2021/0243621 A1 Aug. 5, 2021

(30) Foreign Application Priority Data

Jan. 31, 2020 (JP) .............................. JP2020-014379

(51) Int. Cl.
*H04W 36/00* (2009.01)
*H04W 24/06* (2009.01)
*H04W 36/32* (2009.01)

(52) U.S. Cl.
CPC .......... *H04W 24/06* (2013.01); *H04W 36/32* (2013.01)

(58) Field of Classification Search
None
See application file for complete search history.

(56) References Cited

U.S. PATENT DOCUMENTS

| 9,015,538 B2 * | 4/2015 | Olgaard | H04L 43/50 |
| | | | 714/821 |
| 2012/0100813 A1 * | 4/2012 | Mow | H04B 17/16 |
| | | | 455/67.12 |
| 2012/0327796 A1 * | 12/2012 | Ozaki | H04W 24/06 |
| | | | 370/252 |

(Continued)

FOREIGN PATENT DOCUMENTS

JP H02-58462 A 2/1990
JP 2016-195356 A 11/2016

(Continued)

*Primary Examiner* — Amancio Gonzalez
(74) *Attorney, Agent, or Firm* — Pearne & Gordon LLP (57) ABSTRACT

Included are a first mobile terminal testing device that operates as an LTE base station, a second mobile terminal testing device that operates as an NSA 5G NR base station, and a test control device that controls the first mobile terminal testing device and the second mobile terminal testing device. The test control device includes a command input unit into which a control command for controlling the first mobile terminal testing device and the second mobile terminal testing device is input, a command transmission determination unit that determines a mobile terminal testing device of a transmission destination of the control command, and a command transmission unit that transmits the control command to a transmission destination determined by the command transmission determination unit. The command transmission determination unit determines the transmission destination of the control command according to the type of the control command.

11 Claims, 5 Drawing Sheets

(56) References Cited

U.S. PATENT DOCUMENTS

| | | | | |
|---|---|---|---|---|
| 2013/0005384 A1* | 1/2013 | Tanaka | ................... | H04M 1/24 |
| | | | | 455/517 |
| 2014/0128003 A1* | 5/2014 | Takahashi | ............. | H04W 24/06 |
| | | | | 455/67.7 |
| 2014/0206345 A1* | 7/2014 | Tanaka | ................ | H04B 17/391 |
| | | | | 455/425 |
| 2014/0323059 A1* | 10/2014 | Wakasa | ................ | H04B 17/23 |
| | | | | 455/67.14 |
| 2015/0281984 A1* | 10/2015 | Takizawa | ............. | H04W 24/06 |
| | | | | 455/67.14 |
| 2016/0219449 A1* | 7/2016 | Tanaka | ................ | H04W 24/08 |
| 2019/0053160 A1* | 2/2019 | He | .................... | H04W 52/0216 |
| 2020/0169335 A1* | 5/2020 | Hosoya | ................ | H04B 17/29 |
| 2021/0209011 A1* | 7/2021 | Sheshadri | ........... | G06F 11/3684 |

FOREIGN PATENT DOCUMENTS

| | | | |
|---|---|---|---|
| JP | 2019-176367 A | 10/2019 | |
| JP | 2020-088558 A | 6/2020 | |
| WO | 2017-062244 A1 | 4/2017 | |

\* cited by examiner

FIG. 1

| Command | Parameter | Usage |
| --- | --- | --- |
| BAND | Operation Band | Designate Frequency Band To Be Tested |
| ULCHAN | UL Channel | Designate Center Channel Of Uplink Signal |
| DLCHAN | DL Channel | Designate Center Channel Of Downlink Signal |
| ILVL | Input Level | Designate Transmission Level Of Uplink Signal |
| OLVL | Output Level | Designate Output Level Of Downlink Signal |
| UECAT | UE Category | Designate Category Representing Communication Performance Of UE |
| TDDULDLCONF | UL/DL Configuration | Designate Transmission Allocation Of Uplink Signal And Downlink Signal |
| TDDSSFCONF | Special Subframe Configuration | Designate Configuration Of Special Subframe |
| FRAQRANGE | Frequency Range | Represent Classification Of Frequency Band |
| DLSCS | Subcarrier Spacing | Designate Subcarrier Spacing |

FIG. 2

```
RANOP ENDC

REM_DEST 8000A

OLVL -58.4

8821C:OLVL -58.3

REM_DEST 8821C

ILVL -12.3

8000A:ILVL -12.4
```

MOBILE TERMINAL TESTING SYSTEM, MOBILE TERMINAL TESTING DEVICE, AND CONTROL METHOD FOR MOBILE TERMINAL TESTING SYSTEM

TECHNICAL FIELD

The present invention relates to a mobile terminal testing system for testing a mobile terminal, a mobile terminal testing device, and a control method for the mobile terminal testing system.

BACKGROUND ART

In a case of developing the mobile terminal performing communication while moving a mobile phone or a data mobile terminal, it is necessary to test whether or not the developed mobile terminal can normally perform communication. Therefore, a testing device which operates as a pseudo base station simulating a function of an actual base station is connected to a mobile terminal to be tested, communication is performed between the testing device and the mobile terminal, and a test of checking the contents of the communication is performed.

In the mobile communication system, the standard specification of 5G NR (New Radio), which is a 5th Generation (5G) radio system, has been completed.

In 5G NR, 5G lines are specialized for User plane (U-Plane): User data signal. For Control Plane (C-Plane): communication control signal, the specifications of Non-Standalone (NSA) that transmits and receives signals using a Long Term Evolution (LTE) line, and Stand Alone (SA) that operates independently by 5G NR without linking with LTE are defined.

Patent Document 1 describes handover in NSA and SA communication systems.

When testing a mobile terminal that supports NSA, it is possible to perform testing by using a mobile terminal testing device that supports LTE testing and a mobile terminal testing device that supports 5G NR testing, in cooperation with each other.

When performing such a test, each device is designed to generate a control signal corresponding to each communication method. Therefore, according to the NSA specification, a 5G NR control signal is to be transmitted to a mobile terminal by an LTE mobile terminal testing device.

Japanese Patent Application No. 2018-219107 has proposed that when a 5G NR control signal is transmitted to a mobile terminal, a first mobile terminal testing device operating as a 5G NR base station generates a 5G NR control signal, transmits the generated control signal to a second mobile terminal testing device operating as an LTE base station, and the second mobile terminal testing device transmits the received control signal to the mobile terminal by an LTE control signal, thereby reducing the processing load on the second mobile terminal testing device.

RELATED ART DOCUMENT

Patent Document

[Patent Document 1] WO 2017/062244

DISCLOSURE OF THE INVENTION

Problem that the Invention is to Solve

When a mobile terminal testing device performs testing, it is necessary to set a plurality of parameters for each mobile terminal testing device of the LTE mobile terminal testing device and the 5G NR mobile terminal testing device. Control such as setting of parameters for each mobile terminal testing device can be executed by using a personal computer or the like.

However, when performing a test using two mobile terminal testing devices, an LTE mobile terminal testing device and a 5G NR mobile terminal testing device, it is more efficient to control the two mobile terminal testing devices in parallel.

Therefore, an object of the present invention is to provide a mobile terminal testing system, a mobile terminal testing device, and a control method for a mobile terminal testing system, which are capable of controlling mobile terminal testing devices that support different communication standards in parallel.

Means for Solving the Problem

A mobile terminal testing system according to the present invention is a mobile terminal testing system including: a first mobile terminal testing device (1) that supports a first communication standard (LTE) of mobile communication; a second mobile terminal testing device (2) that supports a second communication standard (5G NR) of the mobile communication; and a test control device (5) that controls the first mobile terminal testing device and the second mobile terminal testing device, the mobile terminal testing system testing a mobile terminal (3) that supports the first communication standard and the second communication standard, in which the test control device includes a command input unit (31) to which a control command for controlling the first mobile terminal testing device and the second mobile terminal testing device is input, a command transmission determination unit (32) that determines either the first mobile terminal testing device or the second mobile terminal testing device as a transmission destination of the control command, and a command transmission unit (33) that transmits the control command to the transmission destination determined by the command transmission determination unit, and the command transmission determination unit determines the transmission destination of the control command, according to a type of the control command.

With this configuration, the mobile terminal testing system according to the present invention determines either the first mobile terminal testing device or the second mobile terminal testing device, as the transmission destination of the control command according to the type of control command, so that it is possible to control mobile terminal testing devices that support different communication standards in parallel.

In the mobile terminal testing system according to the present invention, as the control command, a device designation command for designating either the first mobile terminal testing device or the second mobile terminal testing device may be input to the command input unit, and the command transmission determination unit may determine a mobile terminal testing device designated by the device designation command as the transmission destination of the control command, after the device designation command is input to the command input unit.

With this configuration, since the mobile terminal testing system of the present invention determines the transmission destination of the control command, according to the device designation command, it is possible to control the mobile terminal testing devices that support different communication standards in parallel.

Further, in the mobile terminal testing system according to the present invention, the control command input to the command input unit may designate either the first mobile terminal testing device or the second mobile terminal testing device, and even after the device designation command is input to the command input unit, when a mobile terminal testing device is designated in the control command, the command transmission determination unit may determine the mobile terminal testing device designated in the control command as the transmission destination of the control command.

With this configuration, since the mobile terminal testing system of the present invention determines the transmission destination of the control command as the mobile terminal testing device designated in the control command, it is possible to control the mobile terminal testing devices that support different communication standards in parallel.

Further, in the mobile terminal testing system according to the present invention, the test control device may have a command storage unit (34) that stores the control command input to the command input unit in advance in association with a communication standard, and when the control command which is input to the command input unit is stored in the command storage unit, the command transmission determination unit may determine the mobile terminal testing device that supports the communication standard associated with the control command stored in the command storage unit, as the transmission destination of the control command.

With this configuration, since the mobile terminal testing system of the present invention determines the transmission destination of the control command, according to the communication standard of the control command, it is possible to control the mobile terminal testing devices that support different communication standards in parallel.

A mobile terminal testing device according to the present invention is a mobile terminal testing device including: a first mobile terminal testing unit (1) that supports a first communication standard (LTE) of mobile communication; a second mobile terminal testing unit (2) that supports a second communication standard (5G NR) of the mobile communication; and a test control unit (5) that controls the first mobile terminal testing unit and the second mobile terminal testing unit, the mobile terminal testing device testing a mobile terminal (3) that supports the first communication standard and the second communication standard, wherein the test control unit includes a command input unit (31) to which a control command for controlling the first mobile terminal testing unit and the second mobile terminal testing unit is input, a command transmission determination unit (32) that determines either the first mobile terminal testing unit or the second mobile terminal testing unit as a transmission destination of the control command, and a command transmission unit (33) that transmits the control command to the transmission destination determined by the command transmission determination unit, and the command transmission determination unit determines a transmission destination of the control command, according to a type of the control command.

With this configuration, the mobile terminal testing device of the present invention determines either the first mobile terminal testing unit or the second mobile terminal testing unit, as the transmission destination of the control command, according to the type of control command, so that it is possible to control mobile terminal testing units that support different communication standards in parallel.

A control method for a mobile terminal testing system according to the present invention is a control method for a mobile terminal testing system which includes a first mobile terminal testing device (1) that supports a first communication standard (LTE) of mobile communication, a second mobile terminal testing device (2) that supports a second communication standard (5G NR) for the mobile communication, and a test control device that controls the first mobile terminal testing device and the second mobile terminal testing device, and tests a mobile terminal (3) that supports the first communication standard and the second communication standard, the control method causing the test control device to execute: a command transmission determination step of determining either the first mobile terminal testing device or the second mobile terminal testing device as a transmission destination of the control command which is input to control the first mobile terminal testing device and the second mobile terminal testing device; and a command transmission step of transmitting the control command to the transmission destination determined in the command transmission determination step, in which in the command transmission determination step, the transmission destination of the control command is determined according to a type of the control command.

As described above, in the control method for the mobile terminal testing system of the present invention, either the first mobile terminal testing device or the second mobile terminal testing device is determined as the transmission destination of the control command, according to the type of control command, so that it is possible to control mobile terminal testing devices that support different communication standards in parallel.

Advantage of the Invention

The present invention can provide a mobile terminal testing system, a mobile terminal testing device, and a control method for a mobile terminal testing system, which are capable of controlling mobile terminal testing devices that support different communication standards in parallel.

BEST MODE FOR CARRYING OUT THE INVENTION

Hereinafter, a mobile terminal testing system according to an embodiment of the present invention will be described in detail with reference to the drawings.

Figure 1:
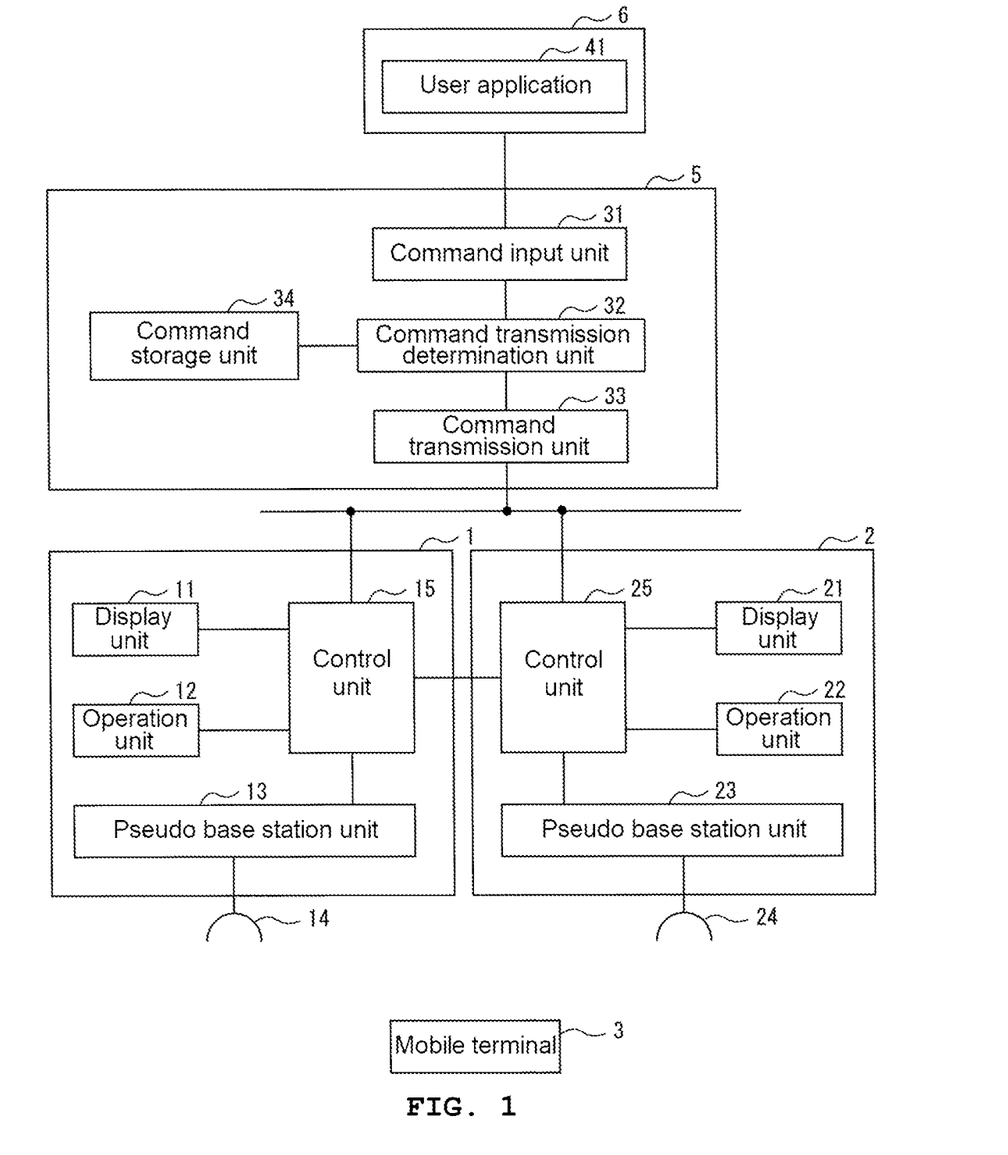
FIG. 1 is a block diagram of a mobile terminal testing system according to an embodiment of the present invention.

In FIG. 1, a mobile terminal testing system according to an embodiment of the present invention includes a first mobile terminal testing device 1, a second mobile terminal testing device 2, a test control device 5, and a terminal device 6.

The first mobile terminal testing device 1 and the second mobile terminal testing device 2 are testing devices that support different communication standards. For example, the first mobile terminal testing device 1 is configured exclusively for the LTE standard, and the second mobile terminal testing device 2 is configured exclusively for the 5G NR standard.

The mobile terminal testing system according to the present embodiment tests a mobile terminal 3 configured to perform communication of a plurality of standards such as 5G NR and LTE.

In the present embodiment, the first mobile terminal testing device 1 and the second mobile terminal testing device 2 transmit and receive signals to and from the mobile terminal 3 wirelessly through the antennas 14 and 24.

The first mobile terminal testing device 1 is a computer unit including a Central Processing Unit (CPU), a Random Access Memory (RAM), a Read Only Memory (ROM), a flash memory, a hard disk device, an input port, and an output port.

In this computer unit, the CPU executes an Operating System (OS) stored in the hard disk device, so the CPU can control devices connected to the input port and the output port.

The first mobile terminal testing device 1 includes a display unit 11, an operation unit 12, a pseudo base station unit 13, an antenna 14, and a control unit 15.

The display unit 11 is an image display device such as a liquid crystal display, and displays an image for inputting necessary information and an image showing a state under test.

The operation unit 12 is input devices such as a keyboard, a mouse, and a touch panel, and outputs operation-input information to the control unit 15.

The pseudo base station unit 13 transmits and receives wireless signals to and from the mobile terminal 3 through the antenna 14, under the control of the control unit 15. The pseudo base station unit 13 controls the communication with the mobile terminal 3, based on the command input from the control unit 15. The pseudo base station unit 13 outputs the state of communication with the mobile terminal 3 to the control unit 15.

The pseudo base station unit 13 can perform LTE communication with the mobile terminal 3 according to the LTE standard.

The control unit 15 is configured by a program stored in the hard disk device of the first mobile terminal testing device 1. The control unit 15 operates on the OS of the first mobile terminal testing device 1, and controls the display unit 11, the operation unit 12, and the pseudo base station unit 13 through the OS to make the computer unit operate as the first mobile terminal testing device 1.

The control unit 15 controls the operation as a pseudo base station by outputting a command to the pseudo base station unit 13, based on the information input to the operation unit 12. The control unit 15 displays an input guide to the operation unit 12, the contents of parameters set in the pseudo base station unit 13, and a state of communication with the mobile terminal 3 output from the pseudo base station unit 13, on the display unit 11.

The second mobile terminal testing device 2 is a computer unit including a CPU, a RAM, a ROM, a flash memory, a hard disk device, an input port, and an output port.

In this computer unit, the CPU executes an OS stored in the hard disk device, so the CPU can control devices connected to the input port and the output port.

The second mobile terminal testing device 2 includes a display unit 21, an operation unit 22, a pseudo base station unit 23, an antenna 24, and a control unit 25.

The display unit 21 is an image display device such as a liquid crystal display, and displays an image for inputting necessary information and an image showing a state under test.

The operation unit 22 is input devices such as a keyboard, a mouse, and a touch panel, and outputs operation-input information to the control unit 25.

The pseudo base station unit 23 transmits and receives wireless signals to and from the mobile terminal 3 through the antenna 24, under the control of the control unit 25. The pseudo base station unit 23 controls the communication with the mobile terminal 3, based on the command input from the control unit 25. The pseudo base station unit 23 outputs the state of communication with the mobile terminal 3 to the control unit 25.

The pseudo base station unit 23 can perform 5G NR communication with the mobile terminal 3 according to the 5G NR standard.

The control unit 25 is configured by a program stored in the hard disk device of the second mobile terminal testing device 2. The control unit 25 operates on the OS of the second mobile terminal testing device 2, and controls the display unit 21, the operation unit 22, and the pseudo base station unit 23 through the OS to make the computer unit operate as the second mobile terminal testing device 2.

Based on the information input to the operation unit 22, the control unit 25 outputs a command to the pseudo base station unit 23 and controls the operation as a pseudo base station. The control unit 25 displays an input guide to the operation unit 22, the contents of parameters set in the pseudo base station unit 23, and a state of communication with the mobile terminal 3 output from the pseudo base station unit 23, on the display unit 21.

The control unit 15 of the first mobile terminal testing device 1 and the control unit 25 of the second mobile terminal testing device 2 are connected with a synchronization cable and can communicate with each other.

The test control device 5 is a general-purpose computer device including a CPU, a RAM, a ROM, a flash memory, a hard disk device, an input port, and an output port.

In this computer device, the CPU executes the OS stored in the hard disk device, so the CPU can control devices connected to the input port and the output port.

The test control device 5 is connected to the first mobile terminal testing device 1 and the second mobile terminal testing device 2 via a network such as a Local Area Network (LAN). Further, the test control device 5 is connected to the terminal device 6 via a network such as a LAN such that socket communication with the terminal device 6 is possible.

The test control device 5 includes a command input unit into which a control command for controlling the first mobile terminal testing device 1 and the second mobile terminal testing device 2 is input, a command transmission determination unit 32 that determines either the first mobile terminal testing device 1 or the second mobile terminal testing device 2 as a transmission destination of the control command, and a command transmission unit 33 that transmits the control command to a transmission destination determined by the command transmission determination unit.

In the present embodiment, the command input unit 31 is mainly composed of an input port, the command transmission determination unit 32 is mainly composed of a CPU, and the command transmission unit 33 is mainly composed of an output port.

Similar to the test control device 5, the terminal device 6 is composed of a general-purpose computer device including a CPU, a RAM, a ROM, a flash memory, a hard disk device, an input port, and an output port.

In this computer device, the CPU executes the OS stored in the hard disk device, so the CPU can control devices connected to the input port and the output port.

The terminal device 6 causes the CPU to execute the user application 41 to cause the first mobile terminal testing device 1 and the second mobile terminal testing device 2 to execute, for example, a test based on the test scenario stored in the hard disk device.

By transmitting, to the test control device 5, a control command for setting various parameters of the first mobile terminal testing device 1 and the second mobile terminal testing device 2, and a control command for transmitting and receiving various signals from the first mobile terminal testing device 1 and the second mobile terminal testing device 2 to a mobile terminal 3, the user application 41 causes the first mobile terminal testing device 1 and the second mobile terminal testing device 2 to execute a test based on the test scenario.

For example, when the mobile terminal 3 that supports NSA is tested, the user application 41 also sets a 5G NR control signal (hereinafter, also referred to as a signaling message) transmitted in the LTE C-Plane, according to the control command transmitted to the second mobile terminal testing device 2.

The control unit 25 of the second mobile terminal testing device 2 generates a signaling message, in response to a control command for generating a signaling message transmitted from the user application 41 via the test control device 5.

The control unit 25 notifies the control unit 15 of the first mobile terminal testing device 1 of the generated signaling message. When the control unit 15 of the first mobile terminal testing device 1 receives the 5G NR signaling message from the control unit 25 of the second mobile terminal testing device 2, the control unit 15 transmits the received signaling message to the mobile terminal 3 on the LTE C-Plane according to the LTE standard.

Figure 2:
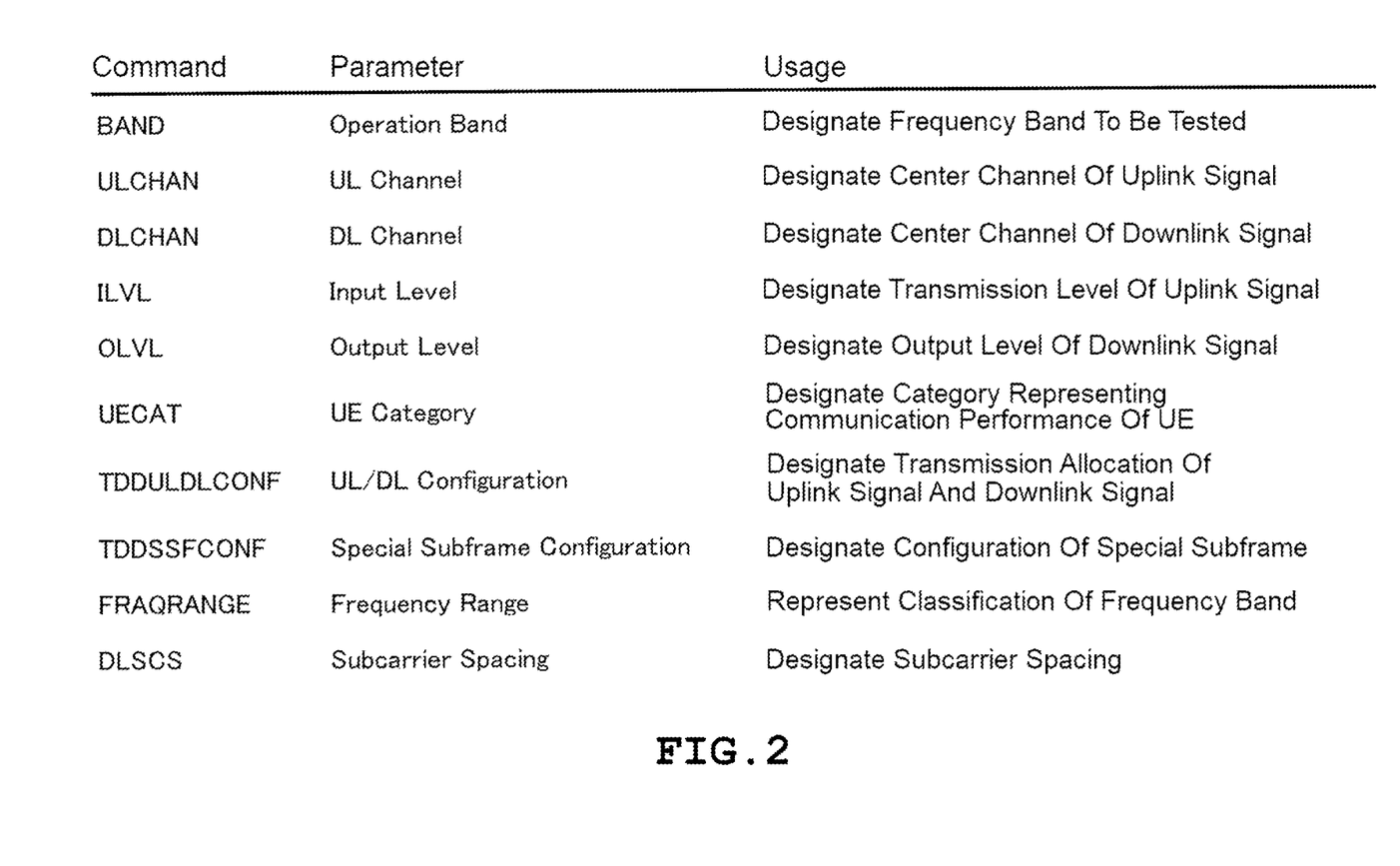
FIG. 2 is a diagram illustrating an example of commands transmitted from a terminal device of the mobile terminal testing system according to the embodiment of the present invention to a test control device.

As illustrated in FIG. 2, the commands transmitted from the terminal device 6 to the test control device 5 include "BAND", "ULCHAN", "DLCHAN", "ILVL", "OLVL", "UECAT", "TDDULDLCONF", "TDDSSFCONF", "FRAQRANGE", "DLSCS", or the like.

"BAND" is a control command for setting the parameter value of "Operation Band", and "Operation Band" designates the frequency band to be tested. "ULCHAN" is a control command for setting the parameter value of "UL Channel", and "UL Channel" designates the center channel of the Uplink signal.

"DLCHAN" is a control command for setting the parameter value of "DL Channel", and "DL Channel" designates the center channel of the Downlink signal. "ILVL" is a control command for setting the parameter value of "Input Level", and "Input Level" designates the transmission level of the Uplink signal. "OLVL" is a control command for setting the parameter value of "Output Level", and "Output Level" designates the output level of the Downlink signal.

Since the above-described "Operation Band", "UL Channel", "DL Channel", "Input Level", and "Output Level" parameters are defined in both 5G NR and LTE, "BAND", "ULCHAN", "DLCHAN", "ILVL", and "OLVL" commands are commands transmitted to any of the first mobile terminal testing device 1 and the second mobile terminal testing device 2.

"UECAT" is a control command for setting the parameter value of "UE Category", and "UE Category" designates a category representing the communication performance of the UE (mobile terminal). "TDDULDLCONF" is a control command for setting the parameter value of "UL/DL Configuration", and "UL/DL Configuration" designates the transmission allocation of Uplink signal and Downlink signal.

"TDDSSFCONF" is a control command for setting the parameter value of "Special Subframe Configuration", and "Special Subframe Configuration" designates the frame configuration of Special Subframe in LTE.

Since the above-described "UE Category", "UL/DL Configuration", and "Special Subframe Configuration" parameters are not defined in 5G NR but defined in LTE, each control command of "UECAT", "TDDULDLCONF", and "TDDSSFCONF" is transmitted to the first mobile terminal testing device 1 but is not transmitted to the second mobile terminal testing device 2.

"FRAQRANGE" is a control command for setting the parameter value of "Frequency Range", and "Frequency Range" represents the classification of the frequency band. "DLSCS" is a control command for setting the parameter value of "Subcarrier Spacing", and "Subcarrier Spacing" designates the interval between subcarriers.

Since the above-described "Frequency Range" and "Subcarrier Spacing" parameters are not defined in LTE but defined in 5G NR, each control command of "FRAQRANGE" and "DLSCS" is transmitted to the second mobile terminal testing device 2 but is not transmitted to the first mobile terminal testing device 1.

In FIG. 1, the command transmission determination unit 32 of the test control device 5 determines the transmission destination of the control command according to the type of the control command received from the terminal device 6.

Figure 3:
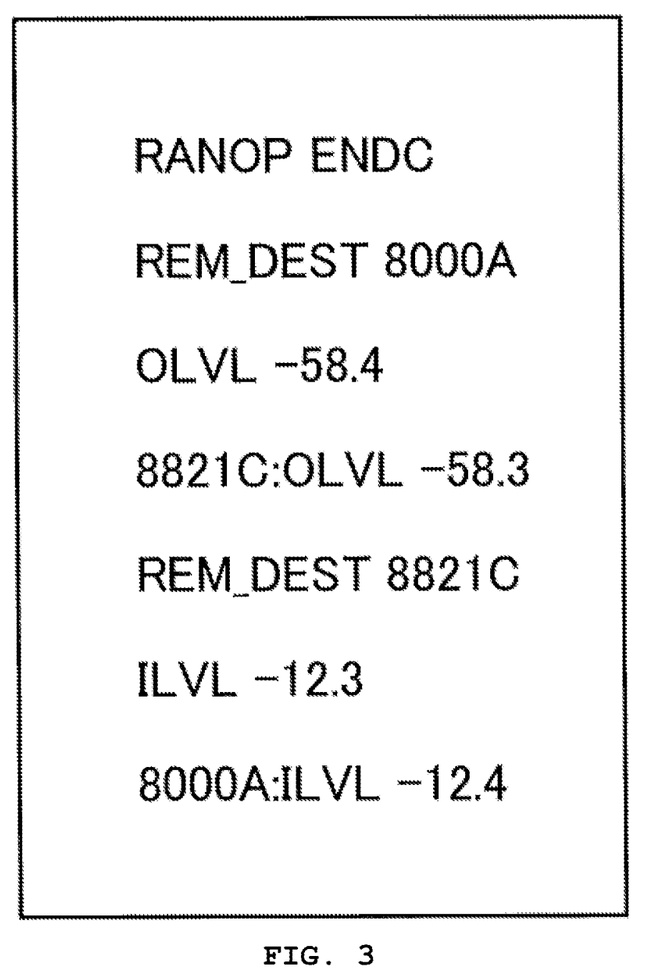
FIG. 3 is a diagram illustrating an example of transmitting a command transmitted from the terminal device of the mobile terminal testing system according to the embodiment of the present invention to the test control device.

As illustrated in FIG. 3, the terminal device 6 transmits a control command to the test control device 5. "RANOP ENDO" on the first line indicates that the NSA-compliant test will be started. "REM_DEST 8000A" on the second line is a control command for designating the transmission destination of the control command transmitted thereafter to the second mobile terminal testing device 2 identified by "8000A".

A control command for designating the transmission destination of the control command transmitted thereafter, such as "REM_DEST", is called a device designation command. The command transmission determination unit 32 does not determine the transmission destination of the device designation command. That is, the device designation command is not transmitted to either the first mobile terminal testing device 1 or the second mobile terminal testing device 2.

"OLVL −58.4" on the third line is a control command for setting the parameter value of "Output Level" to −58.4 (dBm) for the second mobile terminal testing device 2 designated by the device designation command. Since the second mobile terminal testing device 2 is designated by the device designation command on the second line, the command transmission determination unit 32 determines the transmission destination of the control command on the third line as the second mobile terminal testing device 2.

"8821C: OLVL −58.3" on the fourth line is a control command for designating the first mobile terminal testing device 1 identified by "8821C" as the transmission destination, and setting the parameter value of "Output Level" to −58.3 (dBm) for the designated first mobile terminal testing device 1.

With respect to the control command in which the mobile terminal testing device is designated, even after the device designation command is transmitted, the control command is transmitted to the mobile terminal testing device designated in the control command. Therefore, the command transmission determination unit 32 determines the transmission destination of the control command on the fourth line as the first mobile terminal testing device 1 without depending on the device designation command on the second line.

"REM_DEST 8821C" on the fifth line is a device designation command for designating the transmission destination of the control command transmitted thereafter to the first mobile terminal testing device 1 identified by "8821C". "ILVL −12.3" on the sixth line is a control command for setting the parameter value of "Input Level" to −12.3 (dBm) for the first mobile terminal testing device 1 designated by the device designation command. Since the first mobile terminal testing device 1 is designated by the device designation command on the fifth line, the command transmission determination unit 32 determines the transmission destination of the control command on the sixth line as the first mobile terminal testing device 1.

"8000A:ILVL −12.4" on the seventh line is a control command for designating the second mobile terminal testing device 2 identified by "8000A" as the transmission destination, and setting the parameter value of "Input Level" to −12.4 (dBm) for the designated second mobile terminal testing device 2. Therefore, the command transmission determination unit 32 determines the transmission destination of the control command on the seventh line as the second mobile terminal testing device 2 without depending on the device designation command on the fifth line.

In FIG. 2, each control command of "UECAT", "TDDULDLCONF", and "TDDSSFCONF" is a command not defined in 5G NR but defined in LTE, and each control command of "FRAQRANGE" and "DLSCS" is a command that is not defined in LTE but is defined in 5G NR.

The test control device 5 has a command storage unit 34 that stores the control commands input to the command input unit 31 in advance in association with the communication standard. When the control command which is input to the command input unit 31 is stored in the command storage unit 34, the command transmission determination unit 32 determines the mobile terminal testing device that supports the communication standard associated with the control command stored in the command storage unit 34, as the transmission destination of the control command.

For example, when the control command of "UECAT", "TDDULDLCONF" or "TDDSSFCONF" stored in the command storage unit 34 is input to the command input unit 31, the command transmission determination unit 32 determines the transmission destination of the control command as the first mobile terminal testing device 1.

Further, when the control command of "FRAQRANGE" or "DLSCS" stored in the command storage unit 34 is input to the command input unit 31, the command transmission determination unit 32 determines the transmission destination of the control command as the second mobile terminal testing device 2.

The command control operation of the test control device 5 according to the embodiment of the present invention configured as described above will be described with reference to FIG. 4. The command control operation described below is repeatedly executed while the test control device 5 is running.

Figure 4:
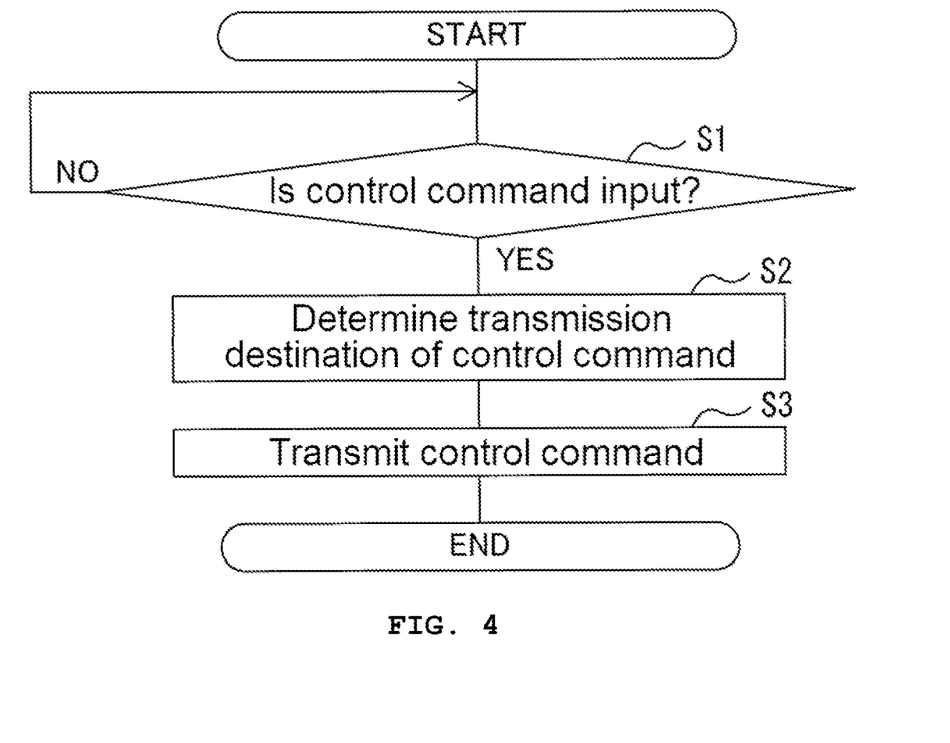
FIG. 4 is a flowchart illustrating a command control operation of a test control device in a mobile terminal testing system according to an embodiment of the present invention.

First, the command transmission determination unit 32 determines whether or not a control command has been input to the command input unit 31 (step S1). When it is determined that no control command has been input to the command input unit 31, the command transmission determination unit 32 executes the process of step S1. That is, the command transmission determination unit 32 is in a waiting state for a control command.

When it is determined that the control command has been input to the command input unit 31, the command transmission determination unit 32 determines whether the transmission destination of the control command is the first mobile terminal testing device 1 or the second mobile terminal testing device 2 (step S2: command transmission determination step). Next, the command transmission unit 33 transmits a control command to the transmission destination determined in step S2 (step S3: command transmission step), and ends the command control operation.

As described above, in the present embodiment, either the first mobile terminal testing device 1 or the second mobile terminal testing device 2 is determined as the transmission destination of the control command, according to the type of control command, so that it is possible to control mobile terminal testing devices that support different communication standards in parallel.

Further, in the present embodiment, since the mobile terminal testing system of the present invention determines the transmission destination of the control command, according to the device designation command, it is possible to control the mobile terminal testing devices that support different communication standards in parallel.

Further, in the present embodiment, since the transmission destination of the control command is determined as the mobile terminal testing device designated in the control command, it is possible to control the mobile terminal testing devices that support different communication standards in parallel.

Further, in the present embodiment, since the mobile terminal testing system of the present invention determines the transmission destination of the control command, according to the communication standard of the control command, it is possible to control the mobile terminal testing devices that support different communication standards in parallel.

Although the example in which the user application 41 is executed by the CPU of the terminal device 6 is illustrated in the present embodiment, the user application 41 may also be executed by the CPU of the test control device 5.

Further, in the present embodiment, an example in which the command input unit 31, the command transmission determination unit 32, the command transmission unit 33, and the command storage unit 34 are provided in the test control device 5 has been described, but the command input unit 31, the command transmission determination unit 32, the command transmission unit 33, and the command storage unit 34 may be provided in either the first mobile terminal testing device 1 or the second mobile terminal testing device 2.

Figure 5:
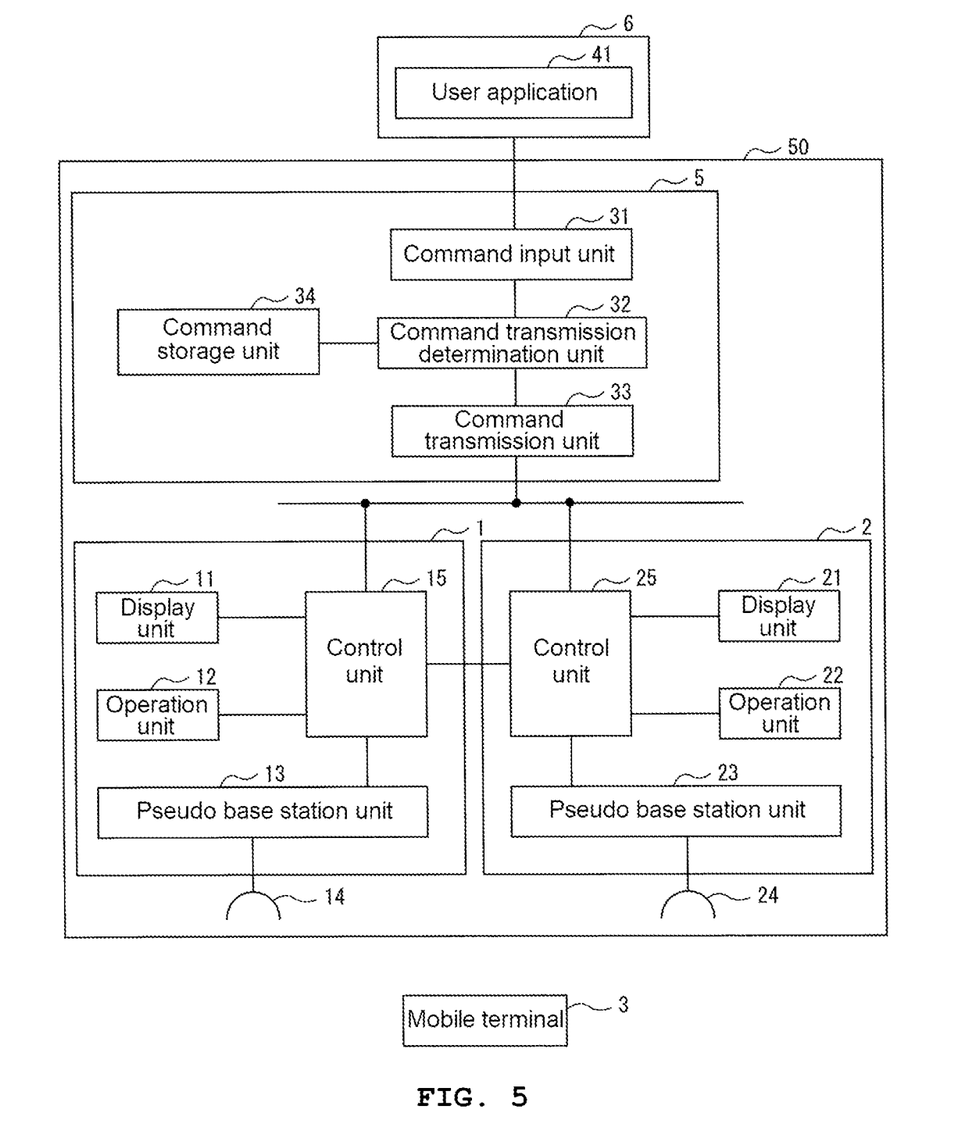
FIG. 5 is a block diagram of a mobile terminal testing device according to a modification example of the embodiment of the present invention.

Further, in the present embodiment, an example in which the first mobile terminal testing device 1, the second mobile terminal testing device 2 and the test control device 5 are individually provided has been described, but as illustrated in FIG. 5, the first mobile terminal testing device 1, the second mobile terminal testing device 2 and the test control device 5 are used as the first mobile terminal testing unit 1, the second mobile terminal testing unit 2, and the test control unit 5, respectively, and the mobile terminal testing device 50 may be configured with the first mobile terminal testing unit 1, the second mobile terminal testing unit 2, and the test control unit 5.

Although the embodiment of the present invention has been disclosed above, modifications may be made easily without departing from the scope of the present invention. The embodiment of the present invention is disclosed on the premise that the equivalent with such modifications is included in the invention described in the claims.

DESCRIPTION OF REFERENCE NUMERALS AND SIGNS

1 First mobile terminal testing device (first mobile terminal testing unit)
2 Second mobile terminal testing device (second mobile terminal testing unit)
3 Mobile terminal
5 Test control device (test control unit)
31 Command input unit
32 Command transmission determination unit
33 Command transmission unit
34 Command storage unit
50 Mobile terminal testing device

What is claimed is:

1. A mobile terminal testing system comprising:
a first mobile terminal testing device that supports a first communication standard of mobile communication;
a second mobile terminal testing device that supports a second communication standard of the mobile communication; and
a test control device that controls the first mobile terminal testing device and the second mobile terminal testing device,
the mobile terminal testing system testing a mobile terminal that supports the first communication standard and the second communication standard, wherein
the test control device includes
a command input unit to which a control command for controlling the first mobile terminal testing device and the second mobile terminal testing device is input,
a command transmission determination unit that determines either the first mobile terminal testing device or the second mobile terminal testing device as a transmission destination of the control command, and
a command transmission unit that transmits the control command to the transmission destination determined by the command transmission determination unit, and
the command transmission determination unit determines the transmission destination of the control command, according to a type of the control command.

2. The mobile terminal testing system according to claim 1, wherein
as the control command, a device designation command for designating either the first mobile terminal testing device or the second mobile terminal testing device is input to the command input unit, and
the command transmission determination unit determines a mobile terminal testing device designated by the device designation command as the transmission destination of the control command, after the device designation command is input to the command input unit.

3. The mobile terminal testing system according to claim 2, wherein
the control command input to the command input unit designates either the first mobile terminal testing device or the second mobile terminal testing device, and
even after the device designation command is input to the command input unit, when a mobile terminal testing device is designated in the control command, the command transmission determination unit determines the mobile terminal testing device designated in the control command as the transmission destination of the control command.

4. The mobile terminal testing system according to claim 1, wherein
the test control device has a command storage unit that stores the control command input to the command input unit in advance in association with a communication standard, and
when the control command which is input to the command input unit is stored in the command storage unit, the command transmission determination unit determines the mobile terminal testing device that supports the communication standard associated with the control command stored in the command storage unit, as the transmission destination of the control command.

5. The mobile terminal testing system according to claim 2, wherein
the test control device has a command storage unit that stores the control command input to the command input unit in advance in association with a communication standard, and
when the control command which is input to the command input unit is stored in the command storage unit, the command transmission determination unit determines the mobile terminal testing device that supports the communication standard associated with the control command stored in the command storage unit, as the transmission destination of the control command.

6. The mobile terminal testing system according to claim 3, wherein
the test control device has a command storage unit that stores the control command input to the command input unit in advance in association with a communication standard, and
when the control command which is input to the command input unit is stored in the command storage unit, the command transmission determination unit determines the mobile terminal testing device that supports the communication standard associated with the control command stored in the command storage unit, as the transmission destination of the control command.

7. The mobile terminal testing system according to claim 1, wherein
the first communication standard for the mobile communication is LTE, and the second communication standard for the mobile communication is 5G NR.

8. A mobile terminal testing device comprising:
a first mobile terminal testing unit that supports a first communication standard of mobile communication;
a second mobile terminal testing unit that supports a second communication standard of the mobile communication; and
a test control unit that controls the first mobile terminal testing unit and the second mobile terminal testing unit,
the mobile terminal testing device testing a mobile terminal that supports the first communication standard and the second communication standard, wherein
the test control unit includes
a command input unit to which a control command for controlling the first mobile terminal testing unit and the second mobile terminal testing unit is input,
a command transmission determination unit that determines either the first mobile terminal testing unit or the second mobile terminal testing unit as a transmission destination of the control command, and
a command transmission unit that transmits the control command to the transmission destination determined by the command transmission determination unit, and
the command transmission determination unit determines a transmission destination of the control command, according to a type of the control command.

9. The mobile terminal testing device according to claim 8, wherein
the first communication standard for the mobile communication is LTE, and
the second communication standard for the mobile communication is 5G NR.

10. A control method for a mobile terminal testing system which includes
a first mobile terminal testing device that supports a first communication standard of mobile communication,
a second mobile terminal testing device that supports a second communication standard for the mobile communication, and
a test control device that controls the first mobile terminal testing device and the second mobile terminal testing device,
and tests a mobile terminal that supports the first communication standard and the second communication standard, the control method causing the test control device to execute:
a command transmission determination step of determining either the first mobile terminal testing device or the second mobile terminal testing device as a transmission destination of the control command which is input to control the first mobile terminal testing device and the second mobile terminal testing device; and
a command transmission step of transmitting the control command to the transmission destination determined in the command transmission determination step,
wherein in the command transmission determination step, the transmission destination of the control command is determined according to a type of the control command.

11. The control method for a mobile terminal testing system according to claim 10, wherein
the first communication standard for the mobile communication is LTE, and
the second communication standard for the mobile communication is 5G NR.

* * * * *